United States Patent
Toschi

(10) Patent No.: US 12,042,836 B2
(45) Date of Patent: Jul. 23, 2024

(54) METHOD AND SYSTEM FOR MONITORING THE GAP IN ROLLING MILLS

(71) Applicant: POMINI Long Rolling Mills S.R.L., Legnano (IT)

(72) Inventor: Francesco Toschi, Legnano (IT)

(73) Assignee: POMINI Long Rolling Mills S.r.l., Legnano (IT)

(*) Notice: Subject to any disclaimer, the term of this patent is extended or adjusted under 35 U.S.C. 154(b) by 235 days.

(21) Appl. No.: 17/438,527

(22) PCT Filed: Feb. 10, 2020

(86) PCT No.: PCT/EP2020/053240
§ 371 (c)(1),
(2) Date: Sep. 13, 2021

(87) PCT Pub. No.: WO2020/182385
PCT Pub. Date: Sep. 17, 2020

(65) Prior Publication Data
US 2022/0143661 A1  May 12, 2022

(30) Foreign Application Priority Data
Mar. 11, 2019 (IT) .................. 102019000003501

(51) Int. Cl.
*B21B 38/00* (2006.01)
*G06N 3/08* (2023.01)

(52) U.S. Cl.
CPC ............... *B21B 38/00* (2013.01); *G06N 3/08* (2013.01)

(58) Field of Classification Search
CPC ........ G06N 3/08; G05B 17/02; G05B 13/027; G05B 2219/37252; B21B 38/00; B21B 2267/24; B21B 37/58
USPC .......................................................... 702/34
See application file for complete search history.

(56) References Cited

U.S. PATENT DOCUMENTS

| | | | |
|---|---|---|---|
| 5,402,521 | A | 3/1995 | Niida et al. |
| 5,586,221 | A | 12/1996 | Isik et al. |

FOREIGN PATENT DOCUMENTS

| | | |
|---|---|---|
| EP | 1043070 A1 | 10/2000 |
| JP | H04190910 A | 7/1992 |
| JP | H05119807 A | 5/1993 |

OTHER PUBLICATIONS

Kim et al., KR20100110221A, "Method and Apparatus for Wear Rate Measurement in Roller Liner", Date Published: (Year: 2010).*
Dagner et al., EP2422894 A1, "Method For Determining The Wear Of A Roller Used To Roll Rolled Goods", Date Published: Feb. 29, 2012 (Year: 2012).*

(Continued)

*Primary Examiner* — John H Le
(74) *Attorney, Agent, or Firm* — Liang & Hennessey LLP; Brian Hennessey

(57) ABSTRACT

Method for monitoring wear to cylinders of the cages of a rolling mill, in particular for bars or rods, including the following steps: reading by a neural network of a plurality of data relating to the initial conditions of one or more rolling cylinders, in particular one or more pairs of cylinders each belonging to a rolling cage, to the settings, and to the running of the process; and generation by the neural network of signals relating to the state of wear of the cylinders.

10 Claims, 1 Drawing Sheet

(56) References Cited

OTHER PUBLICATIONS

International Search Report and Written Opinion received in International Application No. PCT/EP2020/053240 dated Mar. 23, 2020, pp. 13.

Yuan et al., "A Novel Optical Fiber System for Non-touch Detecting Roll Wear Based on Neural Network and Software Imitation," Second Asia-Pacific Conference on Computational Intelligence and Industrial Applications, 2009, pp. 330-333.

* cited by examiner

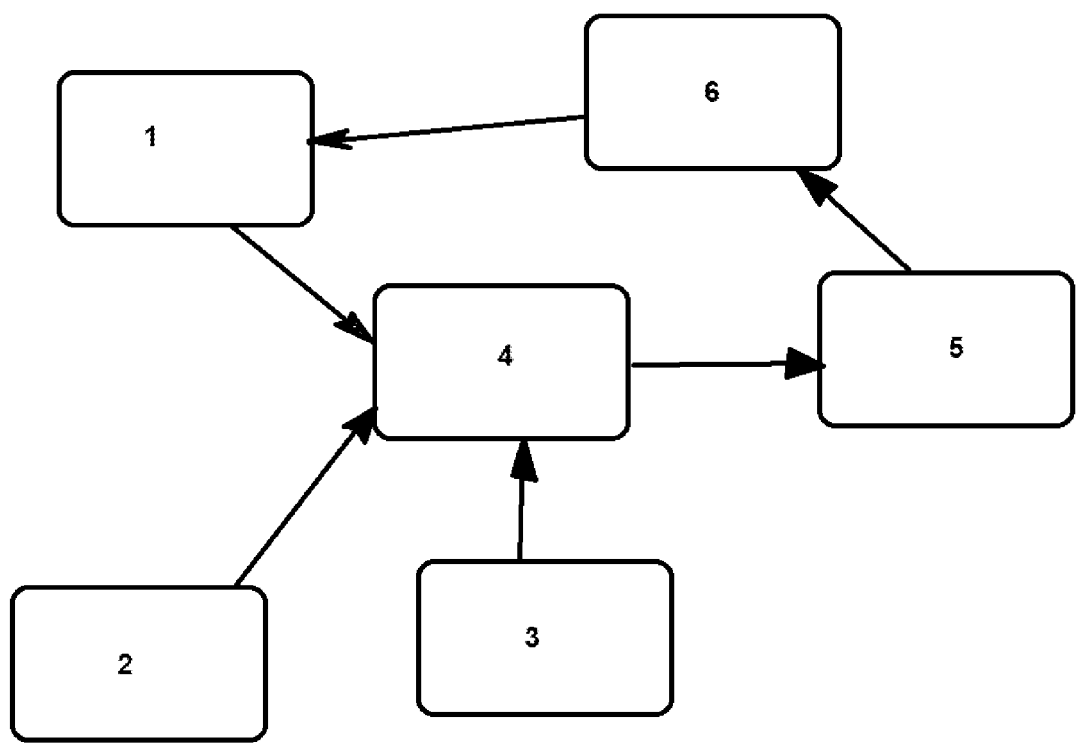

METHOD AND SYSTEM FOR MONITORING THE GAP IN ROLLING MILLS

CROSS-REFERENCE TO RELATED APPLICATIONS

The present application is a national phase application of PCT Application No. PCT/EP2020/053240, filed Feb. 10, 2020, entitled "METHOD AND SYSTEM FOR MONITORING THE GAP IN ROLLING MILLS", which claims the benefit of Italian Patent Application No. 102019000003501, filed Mar. 11, 2019, each of which is incorporated by reference in its entirety.

BACKGROUND OF THE INVENTION

1. Field of the Invention

The present invention relates to a monitoring method and system for monitoring the gap in the rolling mill stands of a rolling mill, in particular a rolling mill for bars, rods, or the like.

2. Description of the Related Art

The rolling mills for the aforesaid processing, of continuous or discontinuous type, typically comprise a series of serial mill stands, which are often more than ten, and which subsequently reduce the caliber of the workpiece and, if appropriate, the variation of the shape of the section. The pairs of cylinders of the mill stands thus have shaped channels. The workpiece passes between a pair of opposite channels, and the pressure of the cylinders, determined by the distance thereof (gap) and the shape of the channels performs the section variation that is the task of the individual mill stand. The mill stands can also provide several stages and several pairs of adjacent channels that alternate in the travel of subsequent workpieces, increasing the working life thereof.

Motors of suitable type, for example of synchronous type, can be adjusted precisely and continuously to ensure sliding of the workpiece, for example avoiding the occurrence of uncontrolled dragging forces between one mill stand and the next, which would affect the section of the workpiece.

One problem connected to the operation of rolling mills formed by several mill stands in series is connected to the significant wear to the cylinders at the channels, which change the section thereof and the shape continuously during a single processing session. This first requires the cylinders to be replaced, and requires adjustment of the gap between the cylinders of a mill stand. The most modern mill stands are equipped with transducers and actuators that permit precise and automated adjustment. Nevertheless, it is very difficult to determine when and to what extent to make adjustments to maintain the features of the workpiece. It must be further considered that the higher the number of mill stands working in series, the more the problem is aggravated. In fact, varying the section exiting a mill stand not only changes, in the subsequent mill stand, the shape of the exiting workpiece, but also changes the rate of wear of the mill stand, with effects that spread and multiply along the rolling mill.

Different types of sensor are available for monitoring the section. Magnetic sensors are very widespread, which are based on the induction of eddy currents, and which are compact and relatively cheap. These can be placed between two mill stands, assisting, for example, the adjustment of the speed of the mill stand downstream. They supply useful data on the section of workpieces with a round section; nevertheless, wear to the channels also leads to shape variations that are not detected, in addition to possibly reducing the reliability of the sensors. In the case of different types of section, for example elliptic sections, the utility of these devices is significantly reduced.

Other types of sensors, like optical sensors, are expensive and require significant space and, if they are placed between two mill stands, the two mill stands should be spaced apart, increasing the dimensions of the rolling mill. The use thereof is accordingly limited, for example to the end of rolling mill and, possibly, to one or a few units placed in selected points between two series of mill stands.

Monitoring wear to and the shape of the workpiece is thus a critical operation. The adjusting needs are commonly met on the basis of the experience of the rolling mill operators. Discontinuity of the adjustments causes discontinuity of the features of the processed items and the unpredictability of the state of wear also reduces the length of the processing and production sessions.

EP 1 043 070 A1 discloses a milling device comprising a roll mill with a plurality of rolls milling a mass and imaging means for imaging a surface of the moving film processed by said rolls. A neural network is used to process the surface.

U.S. Pat. No. 5,586,221 discloses a control for metal rolling mills and the use of an adaptive artificial neural network in a control loop for regulating the final gauge of a metal sheet produced by a metal rolling mill.

SUMMARY OF THE INVENTION

It would thus be desirable to be able to monitor with precision wear to several mill stands, if possible to every single mill stand, preferably continuously or with significant temporal frequency and, if possible intervene more frequently to correct the gap in the mill stands, monitoring the qualitative continuity of the workpiece, combating the cascade effects of wear to a mill stand on the subsequent mill stands, and envisage with precision the need to replace the cylinders, all this not reducing or even increasing productivity.

The problems outlined above have been solved according to the present invention by a method for monitoring wear to the cylinders of the mill stands of a rolling mill comprising the following steps:
  reading by a neural network of a plurality of data relating to the initial conditions of one or more rolling cylinders, in particular one or more pairs of cylinders each belonging to a rolling mill stand, to the settings and to the running of the process;
  generation by the neural network of signals relating to the state of wear of the cylinders, preferably to the tasks to be accordingly performed.

According to one aspect of the invention, the signals generated by the network can result in a series of pieces of information that is made available to the operators, for example through a screen or in another known mode, relating to the adjustment of the distance between the cylinders to be operated, or the need to replace one or more cylinders. According to a further preferred aspect, the signals generated are used to adjust the distance between the cylinders of one or more mill stands. Alternatively, or in combination, the signals generated are used to adjust the speed of the cylinders of one or more mill stands.

According to a further aspect of the invention, a database gathers the data used by the neural network and supplies the data to the neural network. The database can gather preset data and, continuously (this term also refers to periodic data gathering, with suitable sampling frequency), data coming from sensors and process data, data preset manually or automatically.

According to a preferred aspect, a neural network is provided for several pairs of cylinders belonging to a mill stand, preferably for all the mill stands of the rolling mill. According to one aspect of the invention, the neural network is instructed by data obtained from a suitable model. The model can be a physical model, based on theoretical calculations and observations, for example a model of semiempirical model. Models of this type can be present in the literature, or be obtained from observations of the rolling mills. Modelling can be obtained with the finite elements method. Preferably, a second model is used to validate data of a first model. For example, data are obtained with a first physical model, which are verified partially with data obtained from finite elements modelling. In all cases, any model deemed to be appropriate can be used. The neural network is instructed by using serial pairs of input data and output data (output signals) associated therewith by the model. In this manner, the neural network can perform the interpolations and, possibly, the extrapolations required for operation thereof.

The invention also relates to a system comprising at least one neural network as disclosed above and a rolling mill provided with a system as outlined above. The aforesaid claims and those that will be explained below can be used not just in the particular combination shown but also in other combinations or independently, without falling outside the scope of protection of the attached claims.

BRIEF DESCRIPTION OF THE DRAWINGS

The invention will be explained in greater detail below with reference to attached FIG. 1 that shows schematically the structure and operation of a system according to the present invention.

DETAILED DESCRIPTION

According to one aspect of the invention, the neural network acts, for each mill stand for which it is provided, preferably for each mill stand of the rolling mill, as a virtual sensor of cylinder wear, by monitoring the parameters connected thereto during rolling.

During monitoring of rolling, different groups of data exemplified below are considered. In each group, depending on requirements, one or more or all the data items exemplified below can be used or still other data the appropriacy of which is detected. A workpiece can be a bar, a rod or the like, at each stage of processing. Here below, it will be possible to talk generally of bars, in particular in consideration of the product that is supplied to the rolling mill, and this term also means bars, billets or other products and, depending on the context also means products or semifinished products at any stage of rolling for example rods or other section bars of any suitable sectional dimension.

A first group of data relates to the parameters of running the process:
Start time of rolling of workpiece;
rotation speed of the cylinders;
rolling forces and torque, if measured, for example in a known manner;
temperature of the entering workpiece;
temperature measured along the rolling mill if and where suitable sensors are available;
distance between the cylinders (if in the mill stand there are means, for example encoders, for measuring the gap, otherwise, this datum can be a preset datum, which is corrected after possible adjustments);
length of the workpiece that has passed through the mill stand (or through a reference mill stand), which can be the length of a supplied bar, resetting the data for each successive bar, in the case of traditional processing, or of a portion of suitably defined bar in the case of endless or semi-endless rolling mills. The length can also be obtained by integrating over time the transit speed obtained by the measurements.

A second group of input data consists of preset process data, which can be inserted into the system by the user by interface, or be taken from databases or information technology systems relating to the plant and can be:
features, in particular mechanical features in the rolling conditions, in particular the temperature, of the processed material, in particular steel;
distance between cylinders (if not measured in the plant as seen above);
dimensional and shape parameters of the workpiece, for example, height and/or width of the bar entering, in particular the first mill stand monitored by the sensor, area of the section of the bar entering.

The third group of data relates to the cylinders of the monitored mill stands. Also these data are, according to particular aspect of the invention, preset data. According to one embodiment, these data can be obtained from a datum identifying the cylinder, for example a serial number, that enables other database data or plant systems data to be acquired automatically. The data may comprise:
channel in use, in the case of multichannel cylinders, as indicated above;
cylinder hardness;
cylinder diameter;
maximum permitted wear for each channel of the cylinder;
wear thresholds to activate operations like the generation of alarms or the adjustment of the distance between cylinders;
other features, for example geometric features of the calibration.

The neural network can supply a series of output data on a mill stand, for example:
cylinder wear;
width, height and area of the section of the bar exiting the mill stand;
temperature of bar exiting the mill stand;
possible correction of the distance between cylinders to be made.

The neural network can also generate alarms relating to wear, for example indicating the need to make manual corrections to the distance between cylinders or to replace the cylinders.

The output data can be used as input data (first group of data) for the network relating to another mill stand, in particular the mill stand downstream of the mill stand under consideration. The output data can be used to update a process database.

With reference to FIG. 1, a wear control logic is exemplified.

The process parameters 1 (first group of data), monitored, for example at intervals of a few seconds, are detected and stored by the system, for example in a process database 4, into which the preset data of the second 2 and third 3 group are loaded. By processing the data available in the database 4, the neural network 5 calculates the wear data and makes the correction of the distance between the cylinders, if envisaged. The new distance 6 is reintroduced as a process datum into the database, to continue monitoring.

The neural network can be structured in any known manner, for example a neural network can be provided for each mill stand and, as input data it can receive the data on the preceding mill stand, in particular the dimensions and shape of the workpiece, also depending on the calculated wear. In this manner, all the input data are updated continuously and the calculation occurs with maximum precision. This is the equivalent to a single neural network that receives the updated data calculated for each monitored mill stand and supplies the data for each mill stand, storing the data. Different structures can also be found on the basis of the needs and number and position of the monitored mill stands.

The neural networks can be of known type, with one or more hidden layers, depending on requirements, that can be defined during the network training step. They can be made by programming (software) on a machine (CPU) of known type, or be made with specifically dedicated logic units (hardware) or by creating a combination of the different solutions.

The neural networks used in the development of the method according to the present invention can be divided and trained according to the type of calibration: oval and/or round. Further, within one type of calibration, the subdivision can be by intervals of geometric features: diameter of groove bottom, depth of calibration, wear angles, calibration and connection radius. It has been found that it is possible to obtain the same number of nodes for different calibrations.

Normalization of data for the neural network can occur in the traditional manner. For example, the network can be organized according to a fuzzy logic, so the data can be standardized in value intervals between 0 and 1, for example, after defining a value interval that a parameter can adopt in normal operation, assigning a value between 0.01 and 0.99, whereas values outside the normal work value can assume values between 0 and 0.01 and 0.99 and 1, with normalization and denormalization functions of Sigma type.

The neural networks can be trained by running simulations by models. For example, the operation intervals of interest for rolling processes can be defined. A series of simulations is obtained by the models within the interval. For example, a series of simulations is obtained with a physical model of semiempirical type and a part is compared with simulation obtained by the finite elements method, which requires more time to run a simulation. In this manner, precise simulations are obtained, validated by two methods and the precision of the models is tested. For example, the simulations for a mill stand can take account of the following parameters: hardness and diameter of the cylinders, features of the workpiece (calibration, shape and dimensions), distance of the cylinders, productivity, temperature of the bar entering, speed of the cylinders, power, length of the bar that has passed through, features of the steel or other material.

After the values have been obtained that the network has to calculate, the network can be trained with the simulations to enable the network to supply, in a process, the output data seen above. In particular, wear is evaluated as a linear value, for example of the variation in depth of a runner in a preset point and a variation value of the area of the section of the exiting bar. The two combined values provide both a datum on wear, and on the precision thereof, the area being influenced by variations in dimensions of the runner also in points that are not evaluated with linear measurements.

It is clear that the work conditions of the rolling mill have to be as close as possible to those run for the calculation, for example by avoiding pretensioning in supplying the first mill stand of the rolling mill.

EXAMPLE

Two rod-production sessions were run (I and II) in a rolling mill with several mill stands (from S6 to S11 of Tables 1 and 2) and the wear values were obtained (depth variation of the runner in the central part) (Table 1) and variation of the section of the exiting bar (Table 2), for all the mill stands, distinguishing the individual runners (the diameters of the runners are shown in the "runner" column of the same mill stand, where there are several runners. The values are obtained both with a neural network trained on the basis of simulations obtained with the Oike model (ANN columns) and measured at the end of production (measurements column)

The considered process data (first group), used by the neural network were speed of the motors, length of the workpiece that has passed through, temperature measured after mill stand S7 (with pyrometer) diameter of the bar and power of the motors. The preset data (second and third group) were: diameter and hardness of the cylinders, distance of cylinders (not adjusted in these tests), productivity, temperature of bar entering the rolling mill, dimensions of the bar entering the mill stand, geometrical features of the runner (width and depth), features of the steel. The errors contained, in all cases below 4%, indicate the reliability of the neural networks in predicting wear.

NUMERICAL REFERENCES first group of data second group of data third group of data database neural network data exiting network

TABLE 1

| Mill stand | Channel | Measurements [mm] | | ANN [mm] | | Error [%] | |
|---|---|---|---|---|---|---|---|
| | | I | II | I | II | I | II |
| S6 | 100 | 0.58 | 0.60 | 0.57 | 0.60 | 1.78 | 0.43 |
| S7 | 31.5 | 0.58 | 0.59 | 0.56 | 0.58 | 3.63 | 2.04 |
| S8 | 75 | 2.38 | 2.34 | 2.37 | 2.33 | 0.67 | 0.45 |
| S9 | 22 | | | | | | |
| | 24.5 | 1.20 | 1.10 | 1.20 | 1.08 | 0.58 | 1.66 |
| S10 | 78 | 2.74 | 2.54 | 2.72 | 2.53 | 0.51 | 0.56 |
| S11 | 16.5 | 1.50 | | 1.52 | | −1.38 | |
| | 19.5 | | 1.92 | | 1.98 | | −3.12 |
| | 21.5 | | 0.89 | | 0.88 | | 1.02 |

TABLE 2

| Mill stand | Channel | Measurements [mm²] I | Measurements [mm²] II | ANN [mm²] I | ANN [mm²] II | Error [%] I | Error [%] II |
|---|---|---|---|---|---|---|---|
| S6 | 100 | 57.42 | 59.26 | 55.70 | 57.90 | 3.09 | 2.35 |
| S7 | 31.5 | 40.98 | 41.86 | 40.02 | 40.13 | 2.41 | 4.31 |
| S8 | 75 | 111.65 | 108.03 | 111.34 | 107.32 | 0.28 | 0.67 |
| S9 | 22 | | | | | | |
|  | 24.5 | 61.85 | 56.31 | 61.49 | 55.46 | 0.60 | 1.53 |
| S10 | 78 | 114.90 | 104.56 | 114.11 | 103.83 | 0.70 | 0.70 |
| S11 | 16.5 | 41.02 | | 41.68 | | | −1.59 |
|  | 19.5 | | 52.07 | | 54.06 | | −3.69 |
|  | 21.5 | | 36.50 | | 36.20 | | 0.83 |

The invention claimed is:

1. A method for monitoring wear to cylinders of mill stands of a rolling mill for bars or rods, comprising the steps of:
   providing a database comprising:
      a first plurality of data relating to initial conditions of one or more monitored rolling cylinders of a corresponding rolling mill stand, the first plurality of data relating to initial conditions of one or more monitored rolling cylinders being selected from a group comprising at least: channel in use, in case of multichannel cylinders, cylinder hardness, cylinder diameter; maximum permitted wear for each channel of the cylinder, wear thresholds to activate operations like generation of alarms or adjustment of the distance between cylinders, and geometric features of the calibration; and
      a second plurality of data relating to preset process data, the second plurality of data relating to preset process data being selected from a group comprising at least: mechanical features in rolling conditions, in particular a temperature of the processed material, distance between cylinders if not measured in the plant, dimensional and shape parameters of a workpiece, and area of a section of a bar entering; and
   providing a plurality of sensors in corresponding rolling mill stands gathering a third plurality of data relating to parameters of running of the process, the third plurality of data relating to parameter of running of the process being selected from a group comprising at least: start time of rolling of workpiece, rotation speed of the cylinders, rolling forces and torque, temperature of the entering workpiece, temperature measured along the rolling mill, distance between the cylinders, and length of the workpiece that has passed through the cage;
   reading, by a neural network, the first plurality of data, the second plurality of data, and the third plurality of data relating to the parameters of running of the process;
   generating, by the neural network, signals relating to a state of wear of the rolling cylinders, the state of wear being evaluated as a linear value of a variation in depth of a runner in a preset point and a variation value of an area of a section of an exiting bar; and
   performing tasks on a corresponding mill stand according to the generated signals relating to a state of wear of the rolling cylinders.

2. The method according to claim 1, wherein the at least one rolling cylinder comprises at least one pair of cylinders belonging to the corresponding rolling mill stand.

3. The method according to claim 1, wherein the tasks comprise adjusting a distance between the cylinders of one or more monitored mill stands.

4. The method according to claim 1, wherein the tasks comprise adjusting a rotation speed of the cylinders of one or more monitored mill stands.

5. The method according to claim 1, further comprising monitoring, by one or more neural networks including the neural network, wear to several mill stands of a rolling mill.

6. The method according to claim 1, further comprising:
   storing, in a database, preset data and data exiting the neural network; and
   reading, by the neural network, the preset data and the data exiting the neural network.

7. A monitoring system for monitoring wear to the cylinders of the mill stands of a rolling mill, comprising the neural network suitable for running the method according to claim 1.

8. A rolling mill provided with the system according to claim 7.

9. The method according to claim 1, wherein the tasks comprise replacing one or more cylinders.

10. The method according to claim 1, wherein the dimensional and the shape parameters of the workpiece comprise at least one of a height of the bar entering a corresponding mill stand monitored by the sensor and a width of the bar entering the corresponding mill stand.

* * * * *